US012578977B2

(12) United States Patent　　(10) Patent No.:　US 12,578,977 B2

Bruno et al.　　(45) Date of Patent:　Mar. 17, 2026

(54) OMNI-CHANNEL MICRO FRONTEND CONTROL PLANE

(71) Applicant: Wells Fargo Bank, N.A., San Francisco, CA (US)

(72) Inventors: John Bruno, Scottsdale, AZ (US); Sean Edward Falese, Jenkintown, PA (US); Arnaud Versini, Napa, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 18/519,707

(22) Filed: Nov. 27, 2023

(65) Prior Publication Data

US 2025/0173164 A1　May 29, 2025

(51) Int. Cl.
G06F 9/451 (2018.01)
G06F 9/445 (2018.01)

(52) U.S. Cl.
CPC .......... G06F 9/451 (2018.02); G06F 9/44521 (2013.01)

(58) Field of Classification Search
CPC ......... G06F 9/451; G06F 9/44521; G06F 8/38
See application file for complete search history.

(56) References Cited

U.S. PATENT DOCUMENTS

| | | | |
|---|---|---|---|
| 11,086,698 B1 | 8/2021 | Nitsopoulos | |
| 11,137,887 B1 | 10/2021 | Garibaldi et al. | |
| 11,150,791 B1 | 10/2021 | Garibaldi et al. | |
| 11,411,800 B1 | 8/2022 | Murugesan et al. | |
| 2007/0255653 A1 | 11/2007 | Tumminaro et al. | |
| 2007/0300185 A1* | 12/2007 | Macbeth | G06F 9/451 |
| | | | 715/764 |
| 2015/0379581 A1 | 12/2015 | Bruno et al. | |
| 2016/0335454 A1 | 11/2016 | Choe et al. | |
| 2017/0109029 A1* | 4/2017 | Lee | G06T 11/001 |
| 2017/0269791 A1* | 9/2017 | Meyerzon | G06F 16/248 |
| 2020/0285516 A1* | 9/2020 | Darling | G06F 9/547 |
| 2020/0387965 A1 | 12/2020 | Cella | |
| 2021/0132962 A1 | 5/2021 | Makhija et al. | |
| 2021/0192106 A1 | 6/2021 | Bourhani et al. | |
| 2021/0248205 A1 | 8/2021 | Tank et al. | |
| 2021/0326396 A1 | 10/2021 | Chugh et al. | |
| 2022/0114214 A1 | 4/2022 | Reddymakireddy et al. | |

(Continued)

FOREIGN PATENT DOCUMENTS

| | | |
|---|---|---|
| WO | 2018/097928 A1 | 5/2018 |
| WO | 2020/118457 A1 | 6/2020 |

OTHER PUBLICATIONS

U.S. Appl. No. 17/658,015, filed Apr. 5, 2022.
U.S. Appl. No. 63/268,935, filed Mar. 7, 2022.
U.S. Appl. No. 17/663,572, filed May 16, 2022.

*Primary Examiner* — Daniel W Parcher

(74) *Attorney, Agent, or Firm* — Merchant & Gould P.C.

(57) ABSTRACT

An example system comprises a processor and storage containing instructions for generating: a micro front-end (MFE) registry with domain-specific language conformant micro frontends; a first channel control plane UI extension to display certain micro frontends; and a second similar extension; a control messaging module to communicate micro frontends between the registry and the first extension while obtaining user contexts; and one or more federated experience engines to select micro frontends for the second extension based on the obtained user contexts.

16 Claims, 5 Drawing Sheets

(56) References Cited

U.S. PATENT DOCUMENTS

| | | |
|---|---|---|
| 2022/0383284 A1 | 12/2022 | Rastogi et al. |
| 2022/0405152 A1 | 12/2022 | Edamadaka et al. |
| 2023/0007122 A1* | 1/2023 | Edamadaka ........ H04M 3/5183 |
| 2024/0303094 A1* | 9/2024 | Premkrishna ........... G06F 21/44 |
| 2024/0330021 A1* | 10/2024 | Dominguez ........... H04L 67/02 |
| 2024/0406247 A1* | 12/2024 | Boudreau ............. H04L 67/025 |

* cited by examiner

OMNI-CHANNEL MICRO FRONTEND CONTROL PLANE

BACKGROUND

Users access many different types of sites to interact with businesses. These sites are programmed to provide information and desired functionality to the users. Many of these sites rely on legacy systems developed as large monolithic programs, designed as singular, extensive units of code. These monolithic systems, while comprehensive, are inherently complex and present challenges in both development and maintenance.

Legacy systems, by design, are inflexible. When updates occur, they tend to be broad modifications or additions to workflows based on general needs and priorities. However, they lack the granularity required to adapt to specific user requirements, resulting in a one-size-fits-all approach that may not adequately address individual user preferences or needs.

SUMMARY

Embodiments of the present disclosure relate to a control architecture for networking and cloud computing. More particularly, embodiments of the present disclosure are directed to the generation of contextual user interfaces which may be tailored to individual users, application contexts, and locations. Unlike legacy monolithic systems characterized by their rigidity, embodiments of the present disclosure utilize multiple micro front-ends (MFEs). MFEs are smaller independent units of frontend applications, which are stored in a registry and categorized according to a library classification system (e.g., based on their functions or other distinctive features).

A control plane user interface layer extension associated with each channel, which can be web, mobile, or embedded, can interact with one or more federated experience engines residing within the unified control complex to pull MFEs from a registry to compose user experiences adhering to a specific domain language.

Each control plane user interface layer extension can then serve as a host, orchestrator, and regulator to the MFEs to provide an individualized user, context or location unique experience. Additionally, a control messaging facility can oversee communication between the control plane user interface layer extensions of different channels to facilitate shared experiences between users. For instance, an experience tailored for a user in one channel can influence the experience of another user in a different channel, particularly if their interactions are interrelated.

According to aspects of the present disclosure, an example system can include: at least one processor; and non-transitory computer-readable storage storing instructions that, when executed by the at least one processor, cause the system to: generate a micro front-end (MFE) registry module programmed to maintain a listing of domain-specific language conformant micro frontends; generate a first channel control plane user interface extension configured to host and display one or more first micro frontends; generate a second channel control plane user interface extension configured to host and display one or more second micro frontends; generate a control messaging facility module programmed to communicate the one or more first micro frontends from the MFE registry module to the first channel control plane user interface extension, and receive one or more first user contexts from the first channel control plane user interface extension; and generate a federated experience engine configured to select the one or more second micro frontends from the MFE registry module for deployment in the second channel control plane user interface extension based on the one or more first user contexts received from the first channel control plane user interface extension.

In one aspect, the first channel control plane user interface extension is configured to adapt and reconfigure the displayed first micro frontends in real-time based on the one or more first user contexts. In one aspect, the one or more user contexts received from the first channel control plane user interface extension include at least one of: user identity, application context, and device location.

In one aspect, the federated experience engine is configured to analyze the one or more user contexts received from the first channel control plane user interface extension to determine a relevance and a priority of the one or more second micro frontends for the second channel control plane user interface extension. In one aspect, each of a plurality of micro front-ends stored in the MFE registry are categorized using a library classification system based on at least one of their respective functions or distinctive features.

In one aspect, the control messaging facility module is further programmed to facilitate bi-directional communication between the first and second channel control plane user interface extensions. In one aspect, the facilitated bi-directional communication between the first and second channel control plane user interface extensions enables an experience in the first channel control plane user interface extension to influence the user experience in the second channel control plane user interface extension when the interactions are interrelated.

In one aspect, the second channel control plane user interface extension is configured to adapt and display the second micro frontends in real-time based on one or more second user contexts. In one aspect, the second channel control plane user interface extension is further configured to provide feedback to the MFE registry module regarding the performance and user engagement of the one or more second micro frontends.

In one aspect, the system further includes a third channel control plane user interface extension configured to host and display one or more third micro frontends, wherein the federated experience engine is additionally configured to select the one or more third micro frontends from the MFE registry module based on the one or more user contexts received from the first channel control plane user interface extension.

According to aspects of the present disclosure, an example method can include: generating a micro front-end (MFE) registry to maintain a listing of domain-specific language conformant micro frontends; creating a first channel control plane user interface extension to host and display one or more first micro frontends; establishing a second channel control plane user interface extension to host and display one or more second micro frontends; communicating the one or more first micro frontends from the MFE registry to the first channel control plane user interface extension, and receiving one or more first user contexts from the first channel control plane user interface extension using a control messaging facility module; and selecting the one or more second micro frontends from the MFE registry for deployment in the second channel control plane user interface extension based on the one or more first user contexts received from the first channel control plane user interface extension using a federated experience engine.

The details of one or more techniques are set forth in the accompanying drawings and the description below. Other features, objects, and advantages of these techniques will be apparent from the description, drawings, and claims.

DETAILED DESCRIPTION

Figure 1:
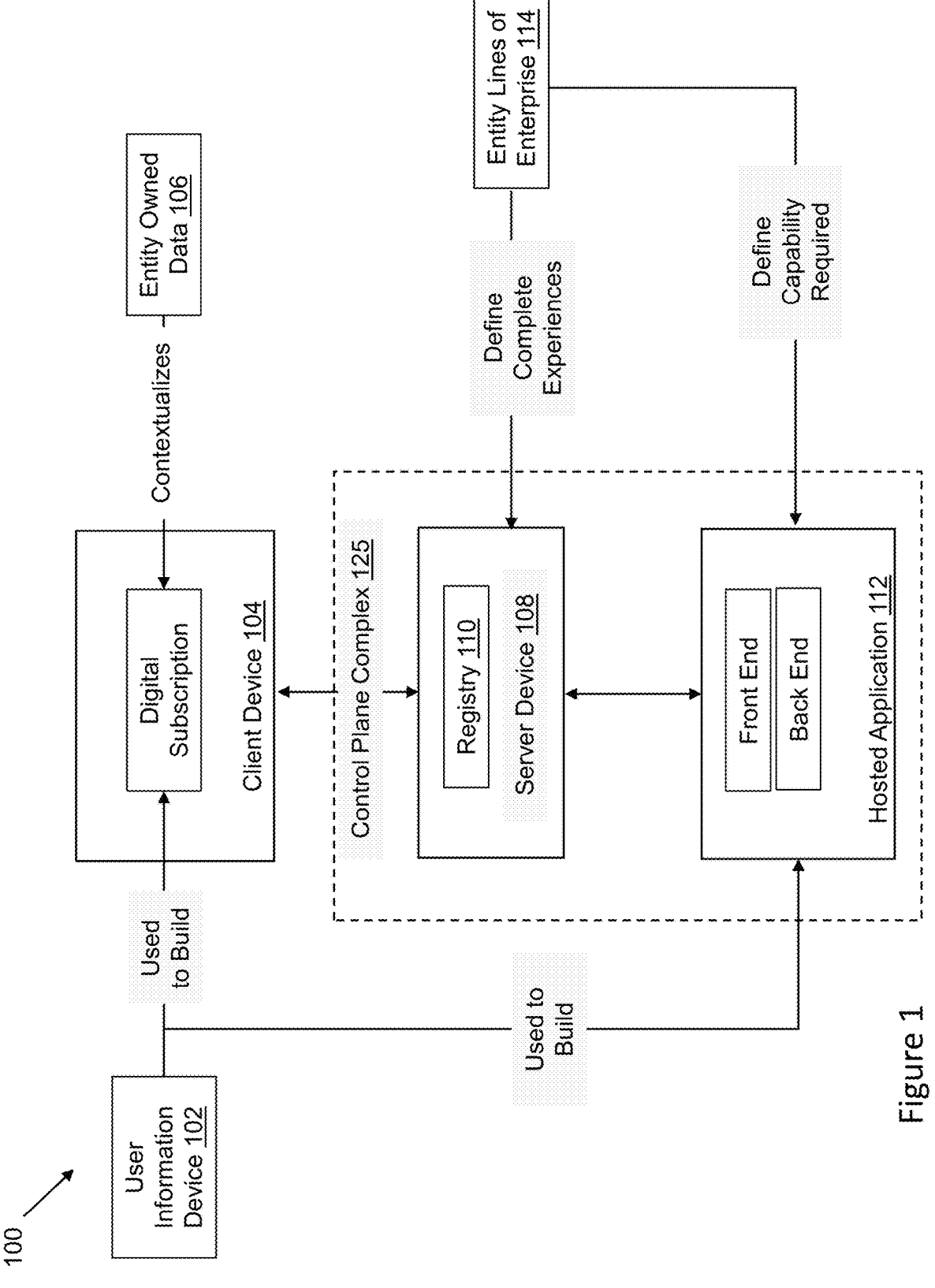
FIG. 1 shows an example system programmed to generate contextual interfaces through a control plane complex using micro front-end components.

The present disclosure generally relates to advancements in networking and cloud computing, and more particularly relates to architecting a unified control complex that facilitates the creation of contextual user interfaces to modulate user interactions across various digital interfaces.

Enterprises utilize legacy systems to control data flow, establishing user interfaces for their sites. These legacy systems were traditionally developed as singular, large monolithic units of code. While they possess the capability to deliver extensive functionalities, these programs also present challenges, particularly inflexibility and inherent complexity. When updates occur, they typically encompass broad workflows, influenced by overarching requirements and priorities. These systems often lack the granularity essential for addressing specific user needs, resulting in a generalized approach that cannot fully accommodate individual user preferences.

Enterprises utilizing legacy monolithic applications may benefit from the introduction of an approach that facilitates the development and publication of micro front-ends (MFEs). Contrary to expansive monolithic structures, MFEs constitute independent, smaller units of frontend applications. Depending on the stipulated contextual interface, these MFE components can manifest in various forms within a user interface.

Across an enterprise, technology teams have the capacity to create reusable MFE components, which subsequently other teams may utilize in the construction of contemporary applications. Such reusable MFE components may be housed in an MFE registry and for organizational efficacy, these units undergo categorization through a library classification system. This system categorizes based on set parameters like distinctive functionalities or other distinguishable features, such as responsiveness and levels of interactivity. This facilitates each team in pursuing development in an agile methodology, minimizing dependencies and risks, and enhancing the speed and efficiency of application development across different projects and departments.

Applications with contextual interfaces can be composed of micro front-end components which adhere to specifications and are retrievable from the MFE registry. Certain tools can be employed to expedite the generation of these conforming MFEs, ensuring developmental efficiency and behavioral consistency.

Further elaborations, nuances, and applications of the system utilizing micro front-ends, as described herein, are detailed in the following U.S. patent applications: U.S. patent application Ser. No. 17/663,572 filed on May 16, 2022, entitled "Micro frontend (MFE) contextual experiences"; U.S. patent application Ser. No. 18/329,749 filed on Jun. 6, 2023, entitled "Micro-frontend Composition and polymorphism"; and U.S. patent application Ser. No. 18/333,222 filed on Jun. 12, 2023, entitled "Hub for Micro Front-End Service." For the sake of thoroughness and clarity, the content, teachings, and disclosures of the aforementioned patent applications are hereby incorporated by reference in their entirety into this description.

Embodiments of the disclosure can enable the generation of contextual user interfaces which may be tailored to individual users, application contexts, and locations. Within the scope of networking and cloud computing, a control plane denotes the system stratum overseeing signaling traffic and orchestrating strategic routing decisions, in contrast to the user or data plane that addresses user-centric data operations. A control plane user interface layer extension associated with each channel, which can be web, mobile, or embedded, can interact with one or more federated experience engines residing within the unified control complex to pull MFEs from a registry to compose user experiences adhering to a specific domain language.

Each control plane user interface layer extension can serve as a host, orchestrator, and regulator to the MFEs to provide an individualized user, context or location unique experience. A control messaging facility can oversee communication between the control plane user interface layer extensions of different channels to facilitate shared experiences between users. For instance, an experience tailored for a user in one channel can influence the experience of another user in a different channel, particularly if their interactions are interrelated.

In some examples, the contextual interfaces are provided in the financial services industry, although the interfaces can be equally applicable in other contexts.

The examples presented herein illustrate the practical implementation of the described architecture. Specifically, the examples highlight a control messaging facility, which governs the communication between control plane UI layer extensions across various channels, aiming to enable shared user experiences. The experience of a user on one channel may potentially influence the experience on a different user on a different channel, particularly when the two interactions display overlapping attributes. The architecture mitigates challenges observed in legacy monolithic systems and endorses the formulation of micro front-ends. Further, it emphasizes reducing interdependencies, thus facilitating efficient delivery.

The architecture, at its foundational level, focuses on the enhancement of computer technology functions, addressing specific challenges to augment the computational performance of contextual interfaces. Many other advantages are possible.

FIG. 1 schematically shows an example system 100 that is programmed to provide a control architecture that utilizes micro front-ends (MFEs) to generate individualized contextual user interfaces, facilitating shared experiences across different channels.

The system 100 generally includes a client device 104 and a server 108. The components of the system 100, such as the client device 104 and the server 108, can include one or more computing devices, such as laptops, desktops, tablets, servers, server farms, etc. Each of the computing devices includes one or more storage media encoding instructions which, when executed by one or more processors, implement the functionality described herein.

Figure 5:
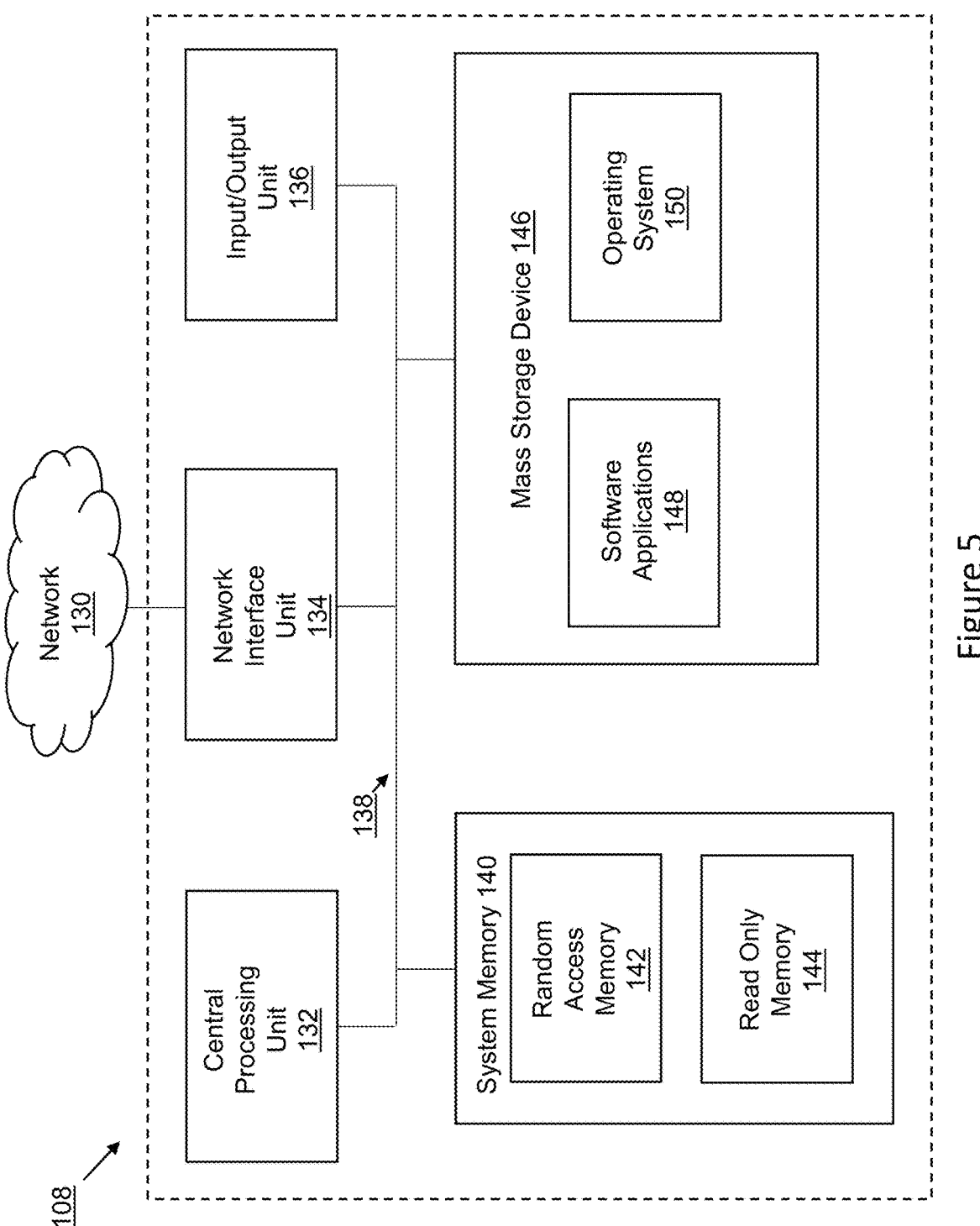
FIG. 5 shows example components of the server device of FIG. 2.

Although multiple computing devices are shown in the system 100, the functionality described herein can be implemented on one or many computing devices. In such examples, each of the computing devices communicate with the others through a network 130 (as depicted in FIG. 5). The network 130 can be any suitable data network, such as the internet, a wide area network, a local area network, a wired network, a wireless network, a cellular network, a satellite network, a near field communication network, or any operatively connected combination of these.

In the example shown, the client device 104 can include a plurality of devices that numbers in the hundreds or thousands. The client device 104 is programmed to provide a contextual interface for a user of the client device 104.

The server 108 can also include a plurality of devices, such as a server farm and/or cloud computing. In this example, the example server 108 includes a registry module 110 and a hosted application module 112. Again, each of these devices can be implemented as a single device (e.g., all within the server 108) and/or as multiple discrete devices within the system 100.

Generally, the example hosted application module 112 is programmed to create and implement micro front-end components. The example registry module 110 is programmed to allow those micro front-end components to be registered and used to generate contextual interfaces at the client device 104.

More specifically, the example registry module 110 is programmed to house a plurality of micro front-end components that can be used to generate a contextual interface for a user. In these examples, the micro front-end components can be combined and reused to generate the interfaces. In some examples, the registry module 110 defines conformance criteria that dictates various aspects of the micro front-end components that are allowed to be registered at the registry module 110. Additional details of the registry module 110 are provided in reference to FIG. 2.

The hosted application module 112 is programmed to facilitate the retrieval of these micro front-end components for implementation in tailored user experiences. This can include providing tools that facilitate the search for and adaption of agnostic micro front-end components. The tools can assist in assuring that the micro front-end components meet the conformance criteria necessary for the micro front-end components to be registered by the registry module 110. More details are provided below.

Figure 2:
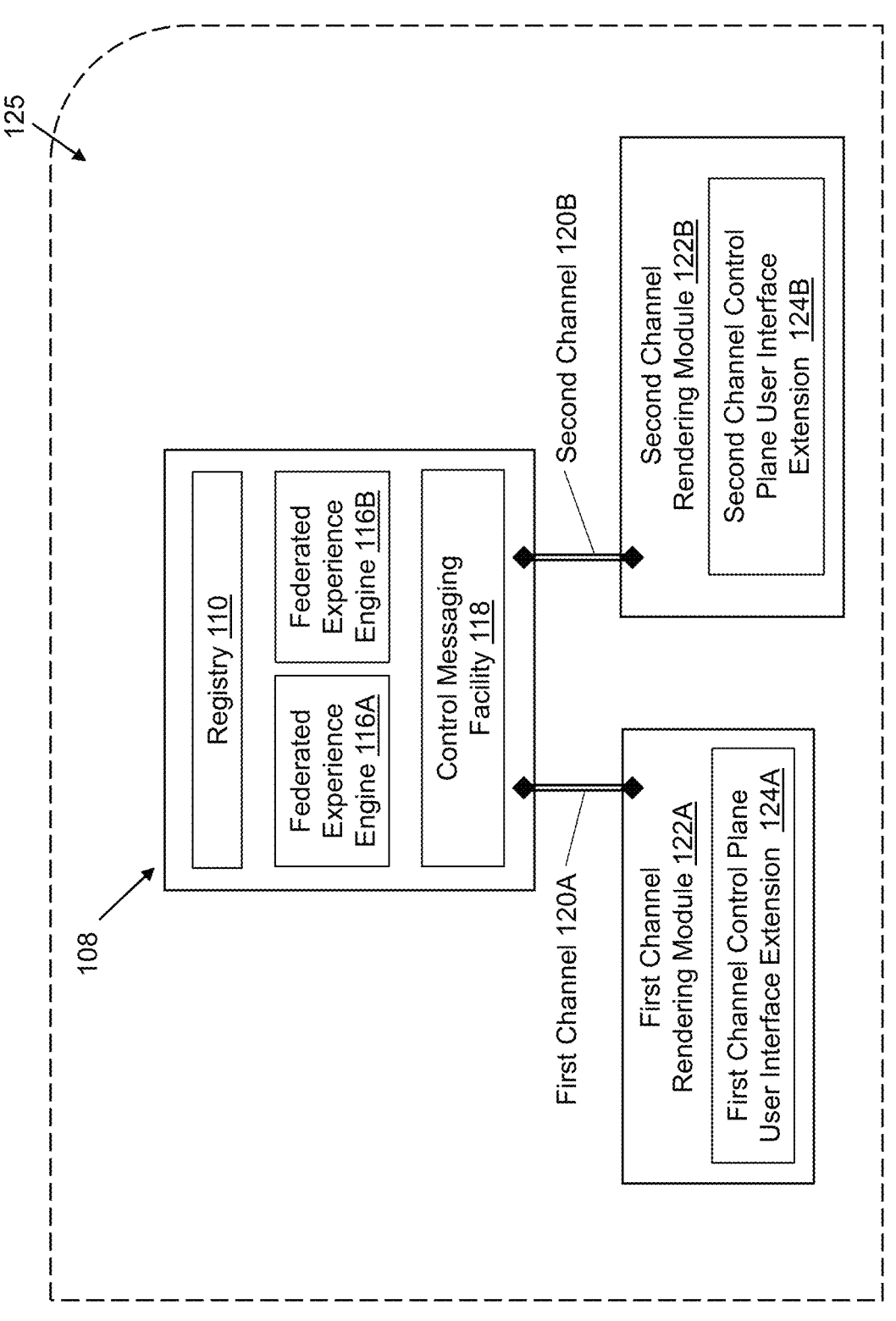
FIG. 2 shows example logical components of the control plane complex of the system of FIG. 1.

Referring now to FIG. 2, additional details about the server 108 are shown. In this example, the server 108 includes the registry module 110, one or more federated experience engine modules 116A, 116B, and a control messaging module 118. Many other configurations are possible.

The registry module 110 is generally adapted to aid in the development and subsequent storage of micro front-end components. The registry module 110 is designed to be accessible to specific users, for instance, developers associated with an organization connected to the system 100. Taking an illustrative example, the organization can be a financial institution, and developers within this financial institution may engage with the registry module 110 for the purpose of crafting micro front-end components. These components are then employed in the development of contextual interfaces tailored for applications that the financial institution delivers to its end-users.

The registry module 110 can incorporate interactive features, which furnish both automated and semi-automated methodologies for the creation of micro front-end components. For example, in some embodiments the registry module 110 can include utilities such as wizards and predefined functionalities. These tools can streamline the semi-automatic generation process of new micro front-end components, making it more accessible and efficient for developers.

Ensuring the quality and standard of these components, the registry module 110 contains programming logic to ascertain that each micro front-end component aligns with specific conformance criteria stipulated by the registry module 110. Details concerning these conformance criteria will be elucidated in subsequent sections.

Focusing on the role of the registry module 110 in resource management, the registry module 110 is configured to maintain a comprehensive library of micro front-end components (MFEs). This library serves as a reservoir for developers, enabling them to access and utilize stored MFEs for the development and augmentation of user interfaces. These MFEs, housed within the registry module 110, are systematically indexed according to a predefined library classification system. This classification system organizes MFEs based on various parameters, such as their function, usage context, or other distinguishing features, ensuring efficient retrieval and application. Through this organized structure, developers can not only retrieve and deploy existing MFEs effectively but can also create new components by integrating two or more existing MFEs, further enhancing the versatility and capabilities of the registry module 110.

Within server 108, there may exist an integral component, which may be referred to as the federated experience engine. In specific configurations, server 108 may encompass multiple instances of the federated experience engine, denoted as 116A and 116B in FIG. 2, each instance of which can be tailored to align with a respective communication channel. For example, as further depicted in FIG. 2, server 108 can be designed to interface a first channel and a second channel.

The federated experience engines 116A and 116B serve as a computational entity that aids in the orchestration of user experiences across various channels. By channel, reference is made to a distinct path or medium through which data transmission occurs or user interactions are facilitated. The use of multiple federated experience engines 116A and 116B enables each engine to be optimized for a designated channel, ensuring desired performance and user experience alignment respective to the channels characteristics.

In one non-limiting example, the federated experience engines 116A and 116B can define one or more API that allow new micro front-end components to be registered within the registry module 110. For example, in some embodiments, the registration can be in the form of a JavaScript Object Notation (JSON) contract, wherein the contract defines the conformance criteria required for each micro front-end component.

Such conformance criteria can encompass various aspects, including technical, design, and performance attributes. The criteria define how the micro front-end component interacts with the standard capabilities of system 100. These interactions can be categorized into "control", overseeing the enforcement of standard capabilities, and "data", which characterizes the behavior of the micro front-end component.

Micro front-end components integrate with the "control" segment. To illustrate, personalizing experiences for users necessitates considerations like: a) user role entitlements (e.g., visibility of the micro frontend, feature invocation, imposed limits); b) user preferences; c) suggestions derived from artificial intelligence for the micro front-end components based on various parameters; d) ongoing experimental assessments, and more.

Micro front-end components are equipped with mechanisms to support capabilities such as state transitions response, analytical data collection, display adjustments, activity-directed queries, experimental participation, feedback provision, deep linking, tracing, and others.

Technical attributes can encompass directives regarding the creation of the micro front-end components-like adherence to designated programming languages and measures to manage sensitive data, such as encryption standards. Design attributes can dictate the aesthetic elements of the interface generated by the micro front-end components, like specific typographical choices, color palettes, and design nuances. Performance attributes can set benchmarks for operational efficiency of the micro front-end components, such as rendering and computational speeds. Various other configurations are plausible.

In certain scenarios, server 108 facilitates the formulation of user profiles. These profiles articulate specific user characteristics, aiding in the development of micro front-end components. For example, profiles can provide demographic data about the user (e.g., geographical location, age), outline user roles (e.g., professional designations, household dynamics), and describe user inclinations.

While server 108 has been described to interact with a first and second channel in this particular instance, the architecture is inherently flexible and can be expanded to accommodate additional channels, each with its respective federated experience engine. The objective of the federated experience engine 116 is to enable a cohesive yet channel-specific user experience, harnessing the capabilities of micro front-end components stored within the registry module 110.

The control messaging module 118 is a dedicated module within system 100 designed to manage and facilitate communications between different components of the system. Specifically, the control messaging module 118 oversees the exchange of messages between various control plane user interface layer extensions associated with distinct channels.

After the micro front-end components have been developed and registered with the marketplace and registry module 110, they are prepared for use by channel control plane user interface extensions to craft the contextual interfaces. For example, as depicted in FIG. 2, the control messaging module 118 is configured to enable communications along a first channel 120A to a first channel rendering module 122A in communication with a first channel control plane user interface extension 124A, as well as to enable communications along a second channel 120B to a second channel rendering module 122B in communication with a second channel control plane user interface extension 124B.

For effective communication, the control messaging module 118 adopts standardized protocols and formats. This standardization ensures seamless and error-free exchange of information between components.

Moreover, the control messaging module 118 may include mechanisms to queue, prioritize, and route messages based on predefined rules or dynamic conditions. This structured approach ensures efficient message handling and timely delivery to the intended recipients. By overseeing communication between the control plane user interface layer extensions, the module ensures that an interaction or experience on one channel can influence or inform the experience on another channel, especially when these interactions are interconnected.

Each channel control plane user interface extension 124A and 122B provides additional contextual information to the micro front-end components during their assembly on a contextual interface. This contextual data typically comprises operational and personal user-related information.

Referring again to FIG. 1, the system 100 incorporates a user information device 102 and an entity owned data device 106, both of which supply supplementary contextual data as the system 100 prepares the contextual interface for users. The user information device 102 facilitates the optimization of the development and deployment of micro front-end components. Notably, this device monitors existing micro front-end component functionalities and recommends the reuse of such components for new functionalities. For example, in a financial institution context, each business line can establish certain aggregated experiences related to user functionalities. The user information device 102 can then propose micro front-end components from the registry module 110 that match the required functionalities.

In an illustrative scenario, imagine a business unit designing a personalized user experience for mortgage payments. This experience is uniquely tailored, incorporating elements like the user's individual preferences, context, location, and habitual interactions as determined by the system. For instance, a separate business line might have developed micro front-end (MFE) components specifically for automobile loan payments. These MFEs, housed in a centralized registry, can be dynamically selected based on their relevance and conformity to the user's specific needs. The user information device 102 can aid in identifying and integrating these components into the mortgage payment experience, drawing upon the most appropriate MFEs from any conformant option available within the registry, regardless of the developer. This approach ensures that the aggregated experience is not only cohesive but also deeply personalized, aligning with the overarching goal of the business unit to provide a seamless and individualized user experience.

The entity owned data device 106 offers unique user-specific information. Using the financial institution scenario, this device can fetch user-related details, including preferences and financial data like account balances. The entity owned data device 106 then forwards this data to the channel control plane user interface extension 124A and 122B to aid in the selection of micro front-end components.

Apart from drawing data from both the user information device 102 and entity owned data device 106, each channel control plane user interface extension 124A and 122B possesses context-aware attributes and employs machine learning to optimize the micro front-end components for the contextual interfaces.

For instance, the channel control plane user interface extension 124A and 122B can leverage machine learning to comprehend user context, such as current and past activities within the system 100. Based on ongoing actions of a user, such as filling out a form, the channel control plane user interface extension 124A and 122B fetches data from the entity owned data device 106 to enhance the user experience by pre-filling forms where applicable.

Each channel control plane user interface extension 124A and 122B is equipped with advanced machine learning capabilities to collect and analyze user interaction data, preferences, and context. This data is then processed by the control plane and provided to the experience engine, which leverages AI/ML for pattern recognition. This enables the delivery of personalized and contextually relevant experiences. For example, the system identifies patterns in a user's interactions, highlighting preferred functionalities while de-emphasizing lesser-used ones. These insights are then conveyed to the rendering modules 122A and 122B.

Additionally, these control plane extensions adapt to platform-specific preferences. If a user predominantly uses a mobile device, the system customizes the micro front-end components to optimize for mobile interfaces, including screen size and touch input. The control plane also conducts tests to refine its understanding of individual or group preferences, experimenting with various functionalities and MFEs across different user segments. This process helps determine preferences based on factors like user roles and bibliographic similarities. The rendering modules 122A and 122B, informed by the control plane, select appropriate MFEs from the registry module 110 to construct a contextually relevant interface for each user.

When a user interacts with the system 100, the federated experience engine 116, in conjunction with the control plane extensions 124A and 122B, retrieves the relevant MFEs from the marketplace and registry module 110. The rendering modules 122A and 122B then assemble these components into a tailored interface, which is displayed on the user's device, such as the client device 104.

In specific scenarios, each rendering module 122A and 122B and/or channel control plane user interface extension 124A and 122B, is designed to dynamically evolve the user experience over time, creating highly individualized interfaces. Initially, these modules may present a generalized interface to all users. However, as they gather more data about user interactions, preferences, context, location, and typical behavior patterns, they adapt and refine the user experience. The system intelligently selects the most appropriate micro front-end (MFE) components from the registry, which have been developed by various developers across the enterprise. This ensures that each user receives a bespoke, contextually relevant experience that aligns with their specific needs and preferences. These personalized experiences contribute to the overarching goal of the business unit to create a comprehensive, aggregated user experience, drawing upon a diverse array of conformant MFEs, each chosen for its relevance to the individual user's context.

Additionally, each rendering module 122A and 122B can be set to run tests over time, creating diverse contextual interfaces for users to identify preferences and efficiencies. Such testing aids the federated experience engines 116 and channel control plane user interface extensions 124A and 122B in deducing the optimal contextual interface for specific users or groups, potentially with the assistance of machine learning insights.

Moreover, each rendering module 122A and 122B can make these adjustments automatically. Additionally, the rendering modules 122A and 122B can be programmed to enable users and/or developers to make changes manually. For instance, the system 100 can offer settings enabling the user to choose between a standard or contextual interface according to their preference. Numerous other configurations are feasible.

Collectively the various components described in FIG. 2 represent elements of a control plane complex 125. For example, the registry module 110, federated experience engines 116A-B, and control messaging module 118 can represent a control plane of server 108, while the channel rendering modules 122A and 122B and channel control plane user interface extensions 124A and 122B can represent a respective control plane for each web, mobile or embedded channel experience. Collectively, the various control planes can be viewed as a single virtual control plane 127 supporting the entire complex or ecosystem.

In embodiments, the control plane complex 125 functions can be likened to that of a virtual machine host in the realm of software architecture. Similar to how a single physical machine can support multiple operating systems or applications through the use of virtual machines, the control plane complex 125 hosts a variety of MFEs. The management of these frontends by the control plane complex 125 is not limited to execution of the MFEs; it also encompasses ensuring that the usage of resources is optimized and that each MFE operates independently and efficiently.

Further, the role of the control plane complex 125 extends to orchestrating the sequence and loading of these the MFEs. In this capacity, the control plane complex 125 acts as a director, determining the specific order and method by which the frontends are displayed to users. In embodiments, decisions can be based on a set of predefined criteria, ensuring that the user interface is both logical and user-friendly.

Additionally, the control plane complex 125 can function as a regulator. In this regulatory role, the control plane complex 125 enforces a series of predefined rules or standards, commonly referred to as the domain-specific language which aids in ensuring that all MFEs maintain a consistent structure, interoperability, and adherence to the overall application's requirements.

The federated experience engines 116A-B operate in tandem with the control plane complex 125, to play role in assembling personalized user experiences. In embodiments, this assembly can be dynamic, influenced by various factors including, but not limited to, a user's authentication data, a contextual state of the application, and a user's physical or digital location within the application or platform. Another influencing factor can be the availability of different micro frontends at any given time, which can vary, thus altering the range and type of experiences that can be delivered.

Several elements impact the user experience, shaping how it is perceived and interacted with by users. For example, the identity and the specific profile of a user can influence the customization of the frontend experience. In some embodiments, the current state or mode of operation of the application can also dictate the nature of the frontend experience, influencing both display and functionality aspects. In some embodiments, a location can influence the experience, which can refer to both the physical geographic location of the user and their navigational context within the application or platform. Additionally, the user experience can be contingent on which micro frontends are currently operational and relevant. This availability directly affects the diversity and suitability of the experiences offered at any moment.

In embodiments, the control plane complex 125 can orchestrate how individual MFEs communicate within and across different user experiences. Communication among MFEs provides for cohesive functioning of the user interface. For instance, an interaction or data change in one MFE can necessitate a corresponding action or update in another MFE. The control plane complex 125 not only facilitates this interaction within a single user experience, such as a session or view, but also extends management capabilities across multiple experiences, which can be particularly relevant when a user engages with an application across different devices or platforms.

In embodiments, the control plane complex 125 can ensure that each MFE adheres to a predefined framework or set of standards. This adherence can aid in maintaining consistency across the different components of the application, thereby avoiding conflicts and potential functionality issues.

Another function of the control plane complex 125 can involve the collection and logging of various types of data. In embodiments, the data can encompass user behavior metrics, performance analytics, error reporting, and other relevant information. Logging can enable the recording of significant events, problems, user interactions, and other crucial data points necessary for analysis, debugging, and ensuring compliance with regulatory or operational standards.

Despite the individualized nature of control planes for each user or channel, the separate aspects of the control plane complex 125 do not operate in isolation. Rather, the control plane complex 125 is a structured network of communication among the various components, facilitating a consistent and seamless experience across the entire digital ecosystem. This intercommunication is particularly important in scenarios where users transition between different channels or when there are global updates and changes that need to be propagated throughout the system 100. Accordingly, even though multiple independent control planes may exist, the control plans collectively function as a control plane complex 125. This unified approach is instrumental in ensuring the ecosystem operates in a harmonious and integrated manner, with each aspect of the control plane contributing to and being aware of the overarching objectives and states of the ecosystem.

Figure 3:
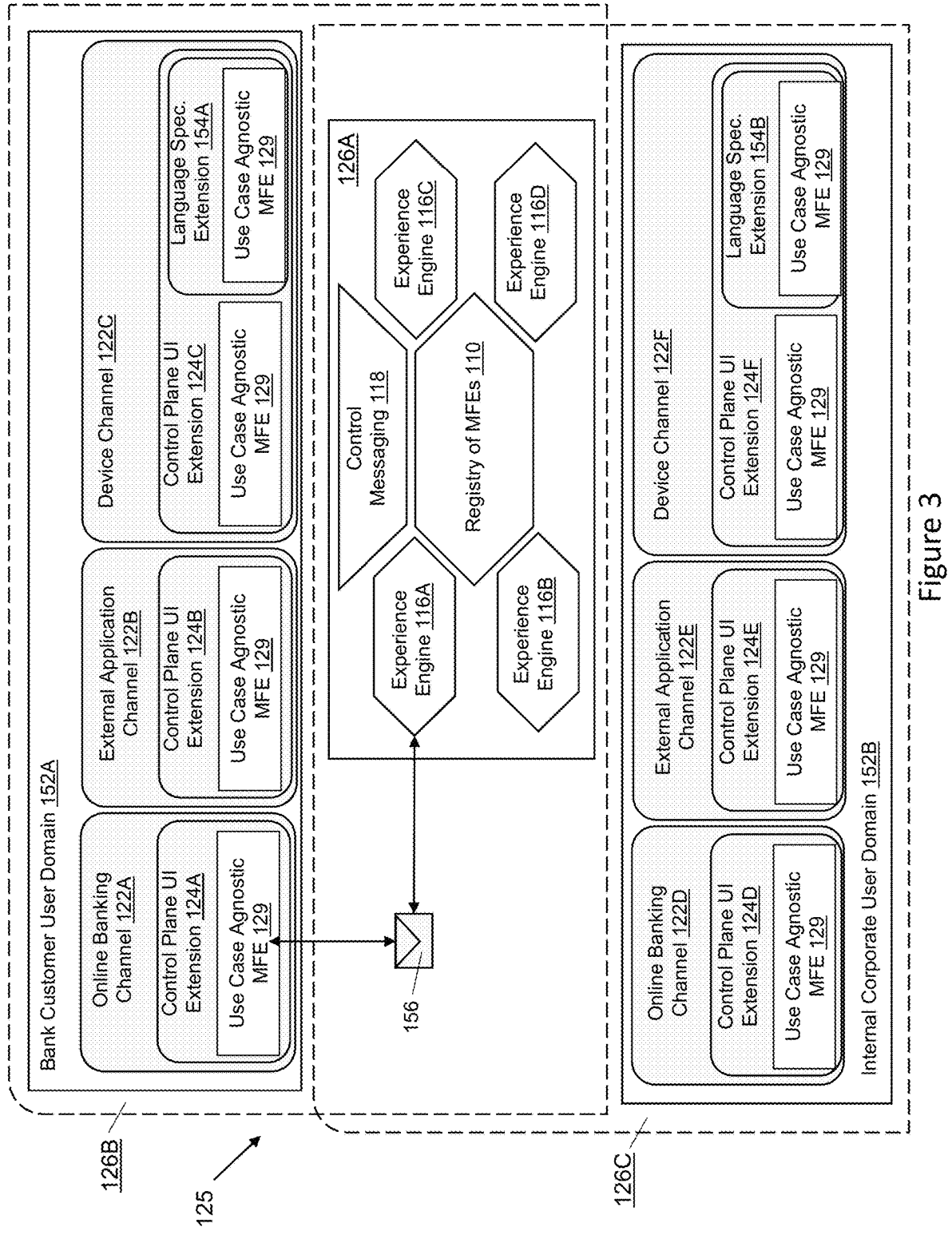
FIG. 3 shows example logical components of an alternative embodiment of a control plane complex programmed to facilitate communication between different channel extensions, enabling interconnected and influenced user experiences across the different channel extensions.

Referring now to FIG. 3, a system architecture diagram of the control plane complex 125 that utilizes MFEs to generate individualized contextual user interfaces, facilitating shared experiences across different channels is shown. As depicted, the control plane complex 125 can include the experience platform control plane 126A including the registry module 110, the control messaging module 118, and one or more federated experience engines 116A-D.

In some embodiments, the registry module 110 functions as a centralized directory or catalog, listing all available Micro Frontends. Each MFE in the Registry module 110 can be developed in compliance with a Domain Specific Language (DSL), ensuring a standardized approach and consistent communication protocol across different MFEs. The purpose of the Registry module 110 is akin to a library system, cataloging a collection of books; in this analogy, each "book" represents a distinct MFE designed and developed according to specific guidelines and standards.

The control messaging module 118 operates similarly to a tailored postal service, by acting as a platform or mechanism enabling DSL-compliant messaging among the components of the system architecture. The control messaging module 118 facilitates communication and data exchange that adhere to the format and structure specified by the DSL, ensuring uniformity in message formatting and interpretation across the system.

The federated experience engines 116A-D are designed to retrieve information from the Registry module 110 and utilize these resources to render or display user experiences. The term "federated" implies that these engines are capable of functioning collaboratively or can independently source resources from different domains. This setup allows for flexibility and scalability in managing and displaying user experiences. The Federated Experience Engines 116A-D are geared towards providing "use case agnostic MFEs", indicating that the MFEs are versatile and adaptable to various use cases or scenarios, irrespective of the specific application or context.

Each of these components plays a role in the experience platform control plane 126A. The Registry module 110 provides a comprehensive listing of available MFEs, adhering to the system's DSL. The control messaging module 118 ensures standardized, efficient communication within the system. Meanwhile, the Federated Experience Engines 116A-D leverage the resources from the Registry module 110 to deliver flexible, adaptive user experiences across various domains and use cases.

The architecture of the experience platform control plane 126A involves communication across two primary domains, each serving distinct user groups and operational purposes, including the banking customer user domain 152A.

The banking customer user domain 152A is designated for interactions with bank customers or external users. These users can include, for example, individual account holders, business clients, and other entities utilizing banking services. The communication and data exchange within the banking customer user domain 152A and between the banking customer user domain 152A and the experience platform control plane 126A are structured to comply with the Domain Specific Language (DSL), ensuring consistency and reliability in message interpretation and handling.

The internal corporate user domain 152B addresses the needs and operations of internal corporate users such as bank employees, management, and administrators, the internal corporate user domain 152B is structured to support internal workflows, decision-making processes, and administrative tasks. Similar to the banking customer user domain 152A, interactions and messaging within the internal corporate user domain 152B and with the experience platform control plane 126A adhere to the DSL.

Further, the system 100 can include integrated complexes for comprehensive domain management. For example, FIG. 3 depicts a bank customer user domain control plane complex 126B and an internal corporate user domain control plane complex 126C.

The bank customer user domain control plane complex 126B represents the integration of the experience platform control plane 126A with the banking customer user domain 152A. The bank customer user domain control plane complex 126B encompasses the necessary infrastructure, communication protocols, and user interface components (such as MFEs) to effectively manage and deliver banking services to external users.

Similarly, the internal corporate user domain control plane complex 126C constitutes the combined operational framework of the experience platform control plane 126A and the internal corporate user domain 152B. The internal corporate user domain control plane complex 126C is designed to streamline internal operations, facilitate decision-making, and enhance administrative efficiency within the corporate structure of the bank.

In both the bank customer user domain control plane complex 126B and the internal corporate user domain control plane complex 126C, the underlying structure and operational protocols are grounded in the principles set by the DSL. This ensures a standardized approach to both external customer-facing processes and internal corporate procedures, maintaining system integrity, and operational consistency.

As further depicted in FIG. 3, the banking customer user domain 152A can include three primary channels, each offering distinct access points and functionalities for banking services, including an online banking channel 122A, an external application channel 122B, and a device channel 122C.

In some embodiments, the online banking channel 122A can include of web portals or applications through which customers access various banking services. The online banking channel 122A can be structured to provide a comprehensive digital banking experience, including but not limited to account management, funds transfer, and financial advisory services.

The external application channel 122B can include applications not directly operated by the bank but offering banking-related services, the external application channel 122B extends the bank's service outreach. These applications might include financial management tools, third-party payment services, and other fintech solutions.

The device channel 122C can include specific banking hardware. For example, the device channel 122C can include ATMs, banking kiosks, and other physically deployed machines intended for direct customer interaction. In embodiments, these devices can facilitate transactions, account inquiries, and other banking operations in a self-service format.

Each of these channels 122A, 122B, 122C can be augmented with a control plane UI layer extension, 124A, 124B, 124C, respectively. The control plane UI layer extensions serve as intermediary layers, hosting and adapting the MFEs to function optimally within their respective environments. These extensions ensure that MFEs are properly integrated, displayed, and operational within the unique context of each channel. The control plane UI layer extensions 124A, 124B, 124C establish a communication framework with their respective federated experience engines 116 to exchange messages 156, enabling a responsive and interactive user interface across various banking channels.

In embodiments, the control plane UI layer extensions 124A, 124B, 124C can incorporate multiple use case agnostic MFEs 129. These MFEs 129 can be adaptable front-end components designed to cater to a variety of functional scenarios based on the specific requirements and context of each channel. By nature, these use case agnostic MFEs 129 can be engineered to be flexible and responsive to the dynamic needs of different banking services and customer interactions.

In certain implementations, the device channel 122C is further equipped with a language specific user interface control plane extension 154A. The language specific user interface control plane extension 154A can be tailored to enhance user interaction through language-specific adaptations, providing a more personalized and accessible banking experience across various geographic and demographic segments. The language specific user interface control plane extension 154A can enable customizations in language and localization, addressing the diverse linguistic needs of users interfacing with the device channel 122C.

With continued reference to FIG. 3, the internal corporate user domain 152B can have a similar structure to the banking customer user domain 152A. For example, the internal corporate user domain 152B can include a range of channels such as an online banking channel 122D, an external application channel 122E, and a device channel 122F. Each channel within the internal corporate user domain 152B can integrate a control plane UI layer extension 124D, 124E, 124F that accommodates various use case agnostic MFEs.

In some embodiments, the online banking channel 122D can provide a digital interface for internal corporate banking operations. The corresponding control plane UI extension 124D can host MFEs that facilitate functionalities specific to corporate banking requirements, offering a tailored digital banking experience for corporate users.

External application channel 122E can encompass applications external to the bank's primary operational software but still integral to corporate banking functionalities. The corresponding control plane UI extension 124E can be configured to ensure that external applications are effectively integrated with the bank's systems, leveraging MFEs for consistent user experiences and interoperability.

Similar to the customer-facing counterparts, the device channel 122F involves banking hardware devices tailored for corporate use, such as specialized ATMs or transactional kiosks. The control plane user interface extension 124F can manage the deployment and operation of MFEs that enable and enhance interactions with these corporate banking devices.

Within the internal corporate user domain 152B, applications can be designed for multifaceted interactions, such as customer service representatives engaging with customers through internal or external control plane experiences, including third-party platforms like accounting software or kiosks in activities like co-browsing, troubleshooting, or acting on behalf of customers with their consent. MFEs which can be reusable across both internal and external domains. Their behavior is defined by the user, context, and location, allowing for extensive reuse and federated development. For instance, a login MFE can be employed across various user interfaces, both internal and external, with the software remaining constant while the behavior adapts based on the platform, user, and context. This approach aligns with the principles discussed in sections 98 and 112 regarding agnostic MFEs, and section 102 concerning consistency, demonstrating the versatility and efficiency of MFEs in enhancing user experience and operational fluidity within the corporate structure several specialized applications may be employed. For example, in some embodiments, and end user support application can be configured to provide assistance and guidance to end-users, addressing queries, troubleshooting issues, and offering user guidance, all while integrating specific MFEs for a user-focused support interface. Similarly, the registry module 110 can act as the central hub for managing all MFEs in the domain. In embodiments, the registry module 110 can function to catalog, update and deploy MFEs, while ensuring adherence to the established Domain Specific Language (DSL), maintaining consistency and reliability. Additionally, a corporate communication application can enhance internal corporate communications, by supporting a range of activities from announcements to collaborative efforts within the corporate structure.

Figure 4:
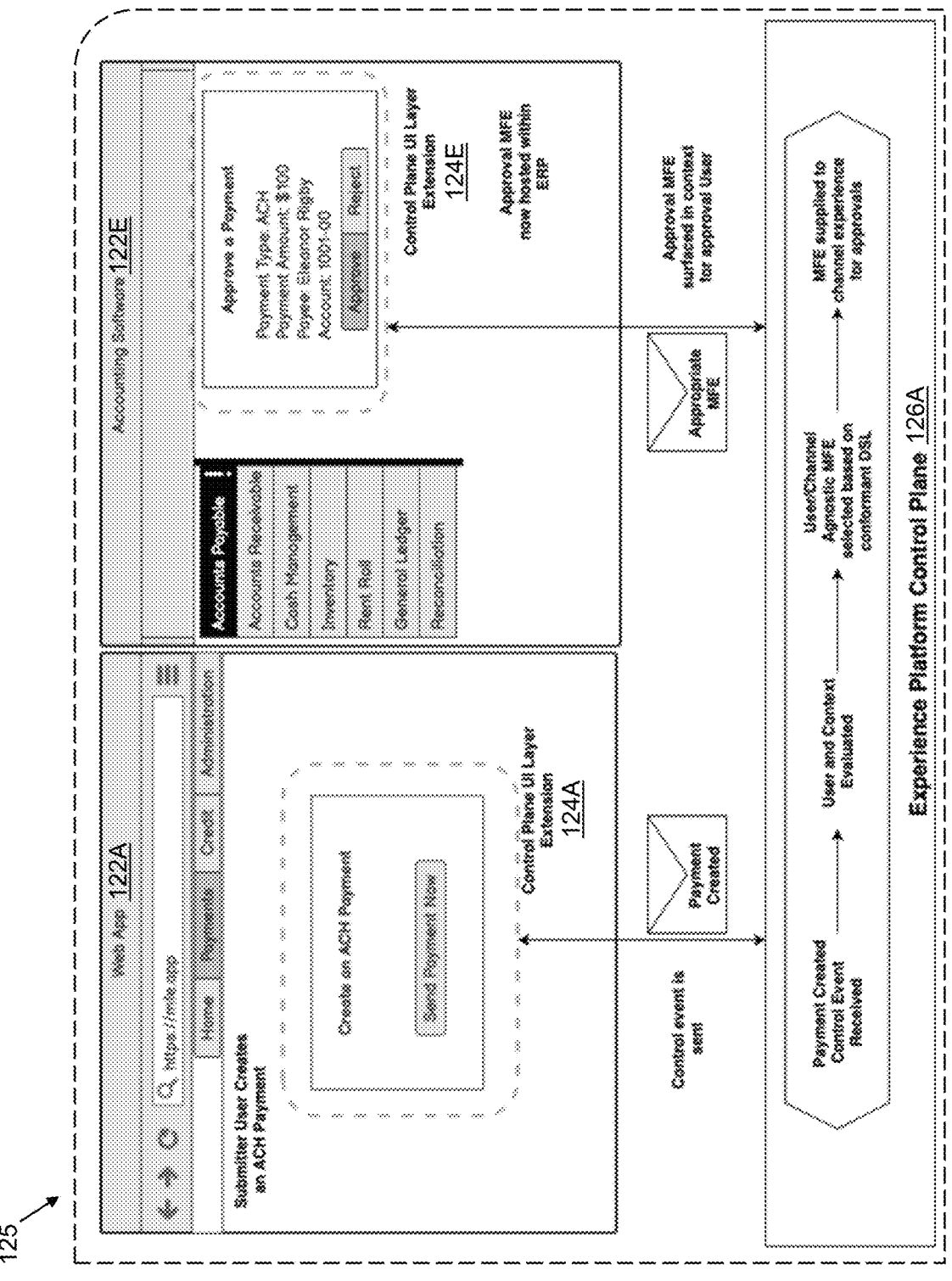
FIG. 4 shows a data flow diagram showing how data moves through of the control plane complex of FIG. 2 to use user experiences and feedback in one channel to influence the experiences of users in a different channel.

Referring now to FIG. 4, a data flow diagram that utilizes MFEs to generate individualized contextual user interfaces, facilitating shared experiences across different channels within the control plane complex 125 is shown. Specifically, the data flow diagram depicts communications between a web application (e.g., represented as an online banking channel 122A) and an experience platform control plane 126A, as well as communications between the experience platform control plane 126A and accounting software (e.g., represented as an external application channel 122E).

Illustrating with an Automated Clearing House (ACH) payment initiation, a user commencing an ACH transaction on a web-based MFE experience can involve actions like entering payment details, selecting a beneficiary, and confirming the operation. Subsequent to this initiation, the control plane UI layer extension 124A, associated with the web channel instigates a distinct MFE experience on a separate platform. For instance, this could manifest as an approval request for another user operational within an Enterprise Resource Planning (ERP) system (e.g., external application channel 122E), integrating an embedded MFE experience.

Accordingly, the experience platform control plan 126A, control plane UI layer extensions 124A and 124E cooperate to function as an intelligent agent that interprets user actions, triggering correlated experiences in real-time across divergent platforms, with "real-time" defined as the capability to process and incorporate feedback within milliseconds to a few seconds after it is generated. Such a mechanism underpins a live integration feature among disparate applications, ensuring that activities on one platform can have immediate implications on user experiences on another platform.

Expanding beyond the web-to-application interaction, System 100 can cater to additional interactivity scenarios, such as Mobile to Web: for example, a user action on a mobile application could prompt a responsive alteration on a web platform. An exemplar of this could be the updating of booking availability on a website instantaneously following a booking confirmation on a mobile application. Furthermore, within a singular mobile application, the channel control plane user interface extension can be configured to bridge native components and webview components seamlessly. An instance of this can involve a user perusing products in a native app layout, but upon opting to read reviews, the application dynamically shifts to a webview, presenting web-based user reviews.

With continued reference to FIG. 4, a process flow within the control plane complex 125 is depicted. The flowchart encapsulates a sequence of interactions and actions focused on the execution and management of an Automated Clearing House (ACH) payment within a web application.

In some embodiments, a user, herein referred to as the "submitter", can initiate an ACH payment on a web application 122A. This initiation can constitute a control event, signifying a notable action necessitating supervision and management. The web application's capability to manage this action is enabled through a control plane UI layer extension 124A, serving as an interface or middleware. The control plane UI layer extension 124A ensures that the submission of the ACH payment is processed in a regulated and predefined manner.

The control event, specifically the initiation of the ACH payment, is transmitted from the web application 122A to the experience platform control plane 126A. This transmission process is facilitated by the control plane UI layer extension 124A within the web application, acting as a conduit for communication between the web application 122A and the experience platform control plane 126A.

Upon receiving information about the ACH payment initiation, the experience platform control plane 126A undertakes an assessment of the event. This assessment encompasses an evaluation of the submitter's identity and the context of the action, considering factors like the user's role, location, and the timing of the action. Subsequently, a user/channel agnostic MFE) is selected based on criteria established by the DSL. This agnostic nature of the MFE signifies its versatility and suitability across different user scenarios and channels. The selected MFE is then dispatched to an appropriate channel for executing further approval processes pertaining to the ACH payment.

As depicted in this embodiment, the process for approval of the ACH payment, enabled by the MFE, becomes manifest within an accounting software system, for example, an Enterprise Resource Planning (ERP) system 122E. The MFE, earmarked for approval, is subsequently incorporated or hosted within the ERP system 122E. This integration within the ERP system 122E is facilitated again by a control plane UI layer extension 124E, ensuring that the MFE is not only correctly operationalized but also provides the necessary interface functionalities As illustrated in the embodiment of FIG. 5, the example server 108, which provides the functionality described herein, can include at least one central processing unit ("CPU") 132, a system memory 140, and a system bus 138 that couples the system memory 140 to the CPU 132. The system memory 140 includes a random access memory ("RAM") 142 and a read-only memory ("ROM") 144. A basic input/output system containing the basic routines that help transfer information between elements within the server 108, such as during startup, is stored in the ROM 144. The server 108 further includes a mass storage device 146. The mass storage device 146 can store software instructions and data. A central processing unit, system memory, and mass storage device similar to that shown can also be included in the other computing devices disclosed herein.

The mass storage device 146 is connected to the CPU 132 through a mass storage controller (not shown) connected to the system bus 138. The mass storage device 146 and its associated computer-readable data storage media provide non-volatile, non-transitory storage for the server 108. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server 108.

According to various embodiments of the invention, the server 108 may operate in a networked environment using logical connections to remote network devices through network 130, such as a wireless network, the Internet, or another type of network. The network 130 provides a wired and/or wireless connection. In some examples, the network 130 can be a local area network, a wide area network, the Internet, or a mixture thereof. Many different communication protocols can be used.

The server 108 may connect to network 130 through a network interface unit 134 connected to the system bus 138. It should be appreciated that the network interface unit 134 may also be utilized to connect to other types of networks and remote computing systems. The server 108 also includes an input/output controller 136 for receiving and processing input from a number of other devices, including a touch user interface display screen or another type of input device. Similarly, the input/output controller 136 may provide output to a touch user interface display screen or other output devices.

As mentioned briefly above, the mass storage device 146 and the RAM 142 of the server 108 can store software instructions and data. The software instructions include an operating system 150 suitable for controlling the operation of the server 108. The mass storage device 146 and/or the RAM 142 also store software instructions and applications 148, that when executed by the CPU 132, cause the server 108 to provide the functionality of the server 108 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:

at least one processor; and non-transitory computer-readable storage storing instructions that, when executed by the at least one processor, cause the system to:

generate a micro frontend (MFE) registry including storage configured to maintain a listing of domain-specific language conformant micro frontends, wherein the listing includes conformance criteria specifying the domain-specific language and performance requirements for inclusion in the listing, the performance requirements including requirements for operational efficiency, rendering speed, or computational speed;

generate a first channel control plane user interface extension programmed to host and display one or more first micro frontends selected from the MFE registry;

generate a second channel control plane user interface extension programmed to host and display one or more second micro frontends selected from the MFE registry;

communicate the one or more first micro frontends from the MFE registry to the first channel control plane user interface extension;

receive one or more first user contexts from the first channel control plane user interface extension, wherein the one or more first user contexts include current and past user activities within the first channel control plane user interface extension;

select the one or more second micro frontends from the MFE registry for deployment in the second channel control plane user interface extension based on the one or more first user contexts received from the first channel control plane user interface extension; and adapt selection of the one or more second micro frontends in real-time based on changes to the one or more first user contexts.

2. The system of claim 1, comprising further instructions that, when executed by the at least one processor, cause the system to analyze the one or more first user contexts received from the first channel control plane user interface extension to determine a relevance and a priority of the one or more second micro frontends for the second channel control plane user interface extension.

3. The system of claim 1, wherein the second channel control plane user interface extension is configured to adapt and display the one or more second micro frontends in real-time based on one or more second user contexts.

4. The system of claim 1, wherein the second channel control plane user interface extension is further configured to provide feedback regarding the performance requirements and user engagement of the one or more second micro frontends.

5. The system of claim 1, comprising further instructions that, when executed by the at least one processor, cause the system to facilitate bi-directional communication between the first and second channel control plane user interface extensions.

6. The system of claim 5, wherein the bi-directional communication between the first and second channel control plane user interface extensions enables an experience in the first channel control plane user interface extension to influence a user experience in the second channel control plane user interface extension when interactions are interrelated.

7. The system of claim 1, further comprising a third channel control plane user interface extension configured to host and display one or more third micro frontends, wherein the one or more third micro frontends are selected based on the one or more first user contexts received from the first channel control plane user interface extension.

8. The system of claim 1, wherein each of a plurality of micro frontends stored in the MFE registry is categorized using a library classification system based on at least one of their respective functions or distinctive features.

9. A method for managing and deploying micro frontends across multiple channels, the method comprising:

generating a micro frontend (MFE) registry including storage configured to maintain a listing of domain-specific language conformant micro frontends, wherein the listing includes conformance criteria specifying the domain-specific language and performance requirements for inclusion in the listing, the performance requirements including requirements for operational efficiency, rendering speed, or computational speed;

creating a first channel control plane user interface extension to host and display one or more first micro frontends selected from the MFE registry;

establishing a second channel control plane user interface extension to host and display one or more second micro frontends selected from the MFE registry;

communicating the one or more first micro frontends from the MFE registry to the first channel control plane user interface extension;

receiving one or more first user contexts from the first channel control plane user interface extension, wherein the one or more first user contexts include current and past user activities within the first channel control plane user interface extension;

selecting the one or more second micro frontends from the MFE registry for deployment in the second channel control plane user interface extension based on the one or more first user contexts received from the first channel control plane user interface extension; and adapting selection of the one or more second micro frontends in real-time based on changes to the one or more first user contexts.

10. The method of claim 9, further comprising analyzing the one or more first user contexts received from the first channel control plane user interface extension to determine a relevance and a priority of the one or more second micro frontends for the second channel control plane user interface extension.

11. The method of claim 9, further comprising adapting and displaying the one or more second micro frontends in the second channel control plane user interface extension in real-time based on one or more second user contexts.

12. The method of claim 9, further comprising the second channel control plane user interface extension providing feedback to the MFE registry regarding the performance requirements and user engagement of the one or more second micro frontends.

13. The method of claim 9, further comprising facilitating bi-directional communication between the first and second channel control plane user interface extensions.

14. The method of claim 13, wherein the bi-directional communication between the first and second channel control plane user interface extensions enables an experience in the first channel control plane user interface extension to influence a user experience in the second channel control plane user interface extension when interactions are interrelated.

15. The method of claim 9, further comprising establishing a third channel control plane user interface extension to host and display one or more third micro frontends, wherein the one or more third micro frontends are selected from the MFE registry based on the one or more first user contexts received from the first channel control plane user interface extension.

16. The method of claim 9, wherein each of a plurality of micro frontends stored in the MFE registry is categorized using a library classification system based on at least one of their respective functions or distinctive features.

* * * * *